US008154561B1

(12) United States Patent  
Voliter et al.

(10) Patent No.: US 8,154,561 B1
(45) Date of Patent: Apr. 10, 2012

(54) DYNAMIC DISPLAY OF A HARMONY RULE LIST

(75) Inventors: Robert Voliter, San Jose, CA (US); Britt Miura, Menlo Park, CA (US)

(73) Assignee: Adobe Systems Incorporated, San Jose, CA (US)

( * ) Notice: Subject to any disclaimer, the term of this patent is extended or adjusted under 35 U.S.C. 154(b) by 823 days.

(21) Appl. No.: 11/728,254

(22) Filed: Mar. 22, 2007

(51) Int. Cl.
 *G09G 5/02* (2006.01)
(52) U.S. Cl. ........................................ 345/594
(58) Field of Classification Search .................. 345/594
 See application file for complete search history.

(56) References Cited

U.S. PATENT DOCUMENTS

| | | | |
|---|---|---|---|
| 4,958,220 A | 9/1990 | Alessi et al. | |
| 5,003,299 A | 3/1991 | Batson et al. | |
| 5,216,493 A | 6/1993 | DiBella et al. | |
| 5,311,212 A | 5/1994 | Beretta | |
| 5,357,110 A | 10/1994 | Statham | |
| 5,381,180 A | 1/1995 | Keith | |
| 5,416,890 A | 5/1995 | Beretta | |
| 5,420,607 A | 5/1995 | Miller et al. | |
| 5,467,110 A | 11/1995 | White et al. | |
| 5,508,718 A | 4/1996 | Haikin | |
| 5,859,644 A | 1/1999 | Stokes et al. | |
| 5,903,255 A | 5/1999 | Busch et al. | |
| 5,909,220 A | 6/1999 | Sandow | |
| 5,943,059 A | 8/1999 | Satoh et al. | |
| 5,959,631 A | 9/1999 | Knittel | |
| 6,081,253 A | 6/2000 | Luke et al. | |
| 6,317,153 B1 | 11/2001 | Fasciano | |
| 6,348,936 B1 | 2/2002 | Berteig | |
| 6,587,102 B2 | 7/2003 | Taylor et al. | |
| 6,727,925 B1 | 4/2004 | Bourdelais | |
| 6,728,398 B1 | 4/2004 | Hondl | |
| 6,731,295 B1 | 5/2004 | MacInnis et al. | |
| 6,795,068 B1 | 9/2004 | Marks | |
| 6,928,187 B2 | 8/2005 | Cooper et al. | |
| 7,136,074 B2 | 11/2006 | Hussie | |
| 7,180,524 B1 | 2/2007 | Axelrod | |
| 7,436,996 B2 | 10/2008 | Ben-Chorin et al. | |
| 2002/0018121 A1 | 2/2002 | Fasciano | |
| 2003/0164839 A1 | 9/2003 | Shih et al. | |
| 2004/0001072 A1 | 1/2004 | Newman | |
| 2005/0206925 A1 | 9/2005 | Agehama | |
| 2006/0028483 A1 | 2/2006 | Kondo et al. | |
| 2006/0044324 A1 | 3/2006 | Shum et al. | |
| 2006/0214935 A1 | 9/2006 | Boyd et al. | |
| 2006/0248081 A1 | 11/2006 | Lamy | |
| 2007/0229861 A1 | 10/2007 | Forbush et al. | |
| 2008/0062192 A1* | 3/2008 | Voliter et al. ................. 345/591 |

OTHER PUBLICATIONS

Pourpre, "colordb," 2005. http://pourpre.com/colordb/?I=eng.*

(Continued)

*Primary Examiner* — Jeffery A Brier
(74) *Attorney, Agent, or Firm* — Van Pelt, Yi & James LLP

(57) ABSTRACT

Display of a harmony rule list is disclosed, including obtaining at least one base color and two or more color harmony rules; for each color harmony rule, computing a derived set of colors based on the at least one base color and the color harmony rule, resulting in two or more derived sets of colors; and simultaneously displaying the derived sets of colors for the two or more color harmony rules.

24 Claims, 8 Drawing Sheets
(4 of 8 Drawing Sheet(s) Filed in Color)

OTHER PUBLICATIONS

Color Wheel Pro, "Getting Started" in Color Wheel Pro Online Help. http://www.color-wheel-pro.com/h-started.html.*

Daniel Cohen-Or, Olga Sorkine, Ran Gal, Tommer Leyvand, Ying-Qing Xu, "Color harmonization," 2006, ACM SIGGRAPH 2006 Papers, pp. 624-630.*

Adobe LiveMotion™2.0, User Guide, p. 87-88.

Hot Door Harmony-Color Schemes for Adobe Photoshop on Mac, http://www.hotdoor.com/harmony/index.php.

Color Schemer Studio Overview, http://colorschemer.com/overview_viewlet_swf.html.

Tiger Color, http://www.tigercolor.com/Images/scrn/color-scheme-designer-01.jpg.

Color Wheel Pro: Features, See Color Theory in Action, http://www.color-wheel-pro.com/features.html Algolist.Manuel.Ru, "Color Quantization Overview" retrieved from Algolist.Manuel.Ru on Jul. 26, 2006.

Paul Heckbert, "Color Image Quantization for Frame Buffer Display", Computer Graphics Lab, vol. 16, No. 3, Jul. 1982.

Behr, www.behr.com, retrieved from www.behr.com on Jul. 26, 2006.

Benjamin Moore, www.benjaminmoore.com, retrieved from www.benjaminmoore.com on Jul. 26, 2006.

Colorfield Software, Xprrof 1.1 Features, retrieved from www.colorfield.com on Jul. 26, 2006.

ColorSchemer, www.colorschemer.com, retrieved from www.colorschemer.com on Jul. 26, 2006.

Color Schemer Online V2, www.colorschemer.com, retrieved from www.colorschemer.com on Jul. 26, 2006.

Liquitex, pixel2paint, www.liquitex.com, retrieved from www.liquitex.com on Jul. 26, 2006.

Rob Griffiths, "Secrets of the Color Picker", Sep. 1, 2005, Macworld.

Navsurf, ColorPicker, Mar. 1, 2003, www.navsurf.com.

Old Jewel Software, Painter's Picker, A Universal Interactive Color Wheel, retrieved from www.oldjewelsoftware.com on Jul. 26, 2006.

Pinball Pal, Using the Pantone Color Cue for Matching Paint Colors, retrieved from www.pinballpal.com on Jul. 26, 2006.

Pantone, Pantone Color Look Up, www.warpgear.com, retrieved from www.warpgear.com on Jul. 26, 2006.

Wellstyled, Color Schemes generator 2, www.wellstyled.com, retrieved from www.wellstyled.com on Jul. 26, 2006.

* cited by examiner

Split Complementary     MyHarmony

Angle = 135      Angle = 135

Angle = 150      Angle = 150

Angle = 165      Angle = 165

DYNAMIC DISPLAY OF A HARMONY RULE LIST

BACKGROUND OF THE INVENTION

Designers, artists, and other users may use a color harmony to color a webpage or other artwork. A color harmony is a set of colors that are derived from one or more base colors using a color harmony rule. As used herein, colors in a color harmony set are referred to as derived colors or harmony colors.

Design and graphics related applications, such as Adobe® Illustrator®, include interfaces or tools that may be used to select a color harmony. Some of them allow the user to select a single color (the base color) and specify a harmony rule. The application then outputs the color harmony corresponding to the selected base color and the harmony rule. The harmony rule choices are typically displayed as a text list of standard harmony rules, such as split complementary, triad, complementary, and analogous. One tool displays the harmony rule choices as thumbnail sized icons on buttons. Each icon shows a schematic diagram of a color wheel (a circle with black dots at different locations on the circle) that represents the harmony rule.

Text lists and icons are limited in their ability to allow a user to visualize the actual derived colors that correspond to each color harmony rule. For example, many users are not aware of all the standard color harmony rule names. Even if they are aware of the color harmony rule names, color harmony rules are typically geometry based, and it is difficult to visualize color in terms of geometry. Besides geometry based harmony rules, some harmony rules are more complex and can't be represented by a color wheel icon. In some cases, custom or user-designed harmony rules are used, but a user may not remember the custom harmony rule or may not be the creator of the custom harmony rule, making it even more difficult to visualize the derived colors for custom harmony rules. It would be useful to have an improved interface for selecting a color harmony rule.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1A:
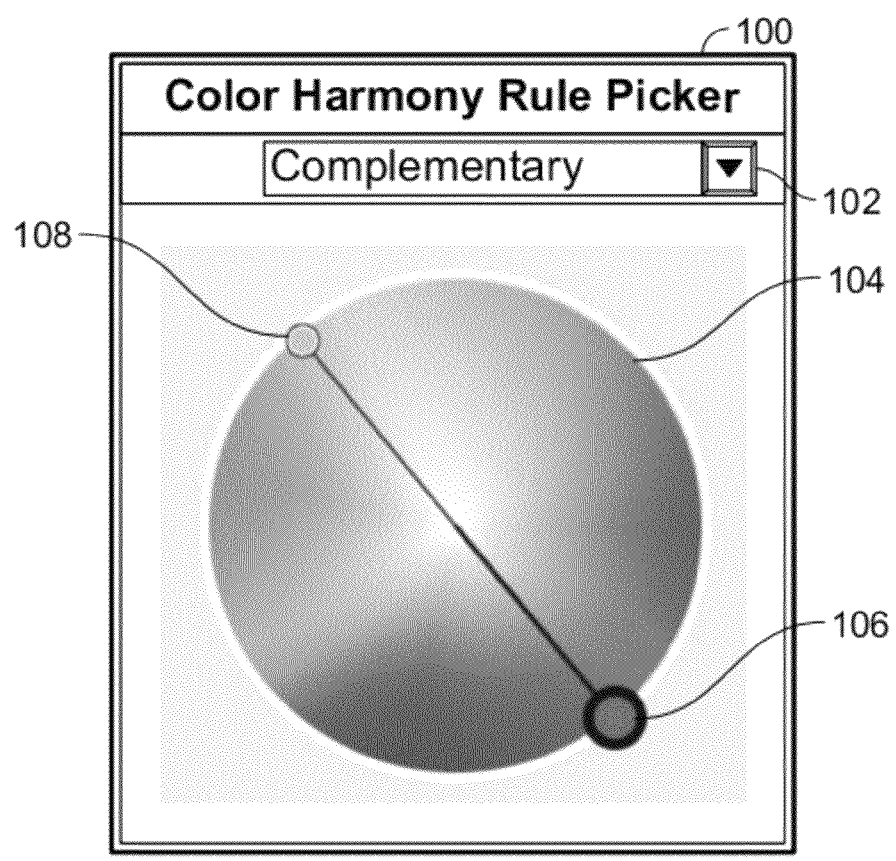
FIG. 1A is a diagram illustrating an interface for selecting a color harmony rule.

FIG. 1A is a diagram illustrating an interface for selecting a color harmony rule. In this example, interface 100 is shown to include pull down menu 102, color wheel 104, circle 106, and circle 108. Pull down menu 102 shows the currently selected color harmony rule, complementary. Circles 106 and 108 correspond to the derived colors and are located on the color wheel at locations that correspond to the complementary color harmony rule, i.e., they are located opposite each other (180 degrees apart) from each other at a given radius (which may be input by the user). The input base color in this case corresponds to circle 106. The input base color may be specified by the user in various ways. For example, the user may use a mouse or other pointing device to select and drag circle 106 to a new location in color wheel 104.

Figure 1B:
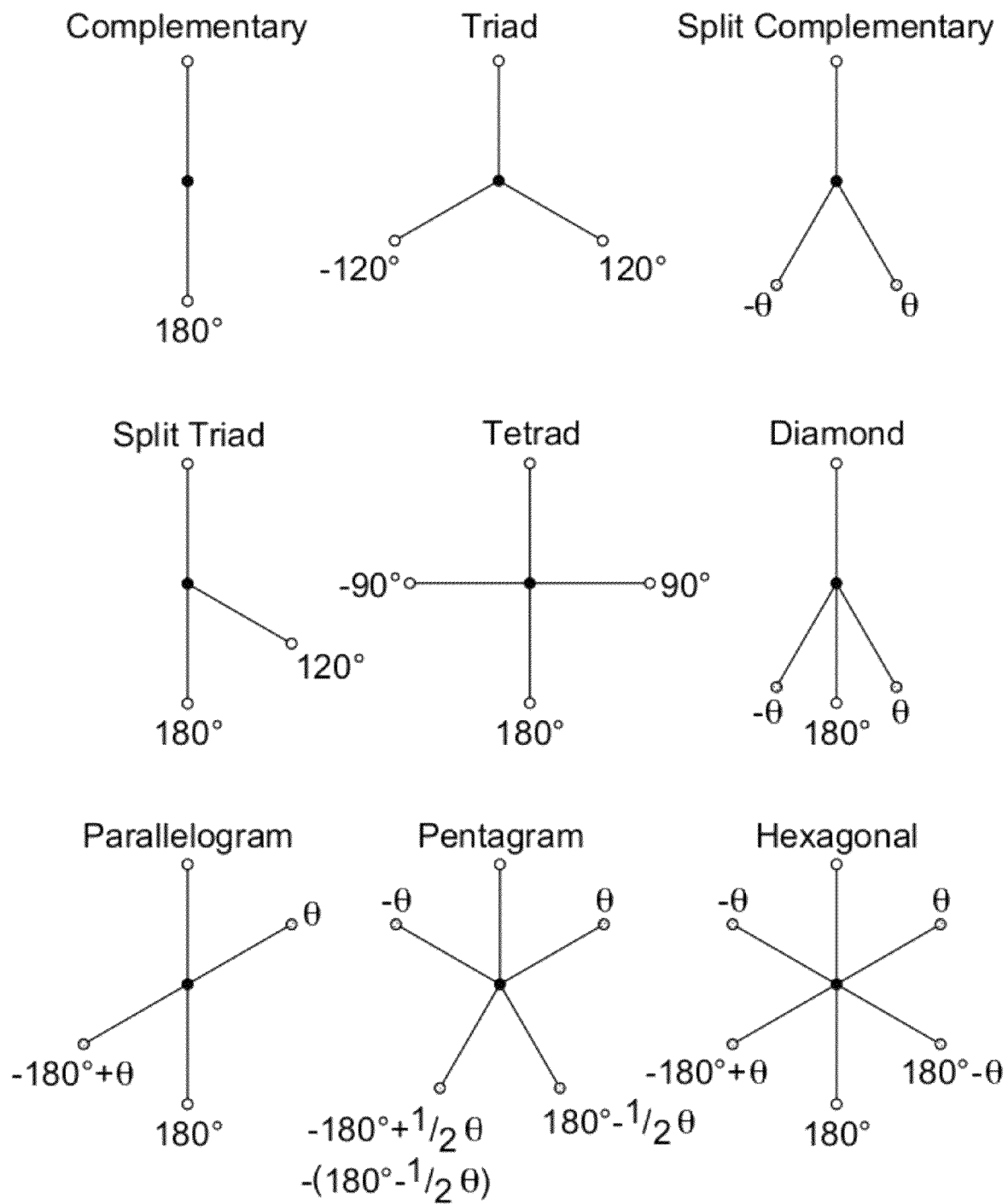
FIG. 1B illustrates some examples of color harmony rules.

Color harmony rules may be specified based on geometric relationships (such as angle offsets from a base color) between base and/or derived color(s) in a color wheel. For example, there are a number of color harmony rules that are specified based on a color wheel in which hue varies with the angle of the wheel. Some examples of color harmony rules specified in this way include: complementary, analogous, and split complementary. FIG. 1B illustrates some examples of color harmony rules. Color harmony rules may be specified in other ways that do not have to do with a color wheel, such as using functions or formulas, which may be piecewise or nonlinear. A harmony rule may specify some or all the components of a color. For example, some harmony rules may only specify hue, in the HSB color model, while others may fully specify HSB.

In order to view the derived colors for a different color harmony rule, the user makes a selection from pull down menu 102.

Figure 2A:
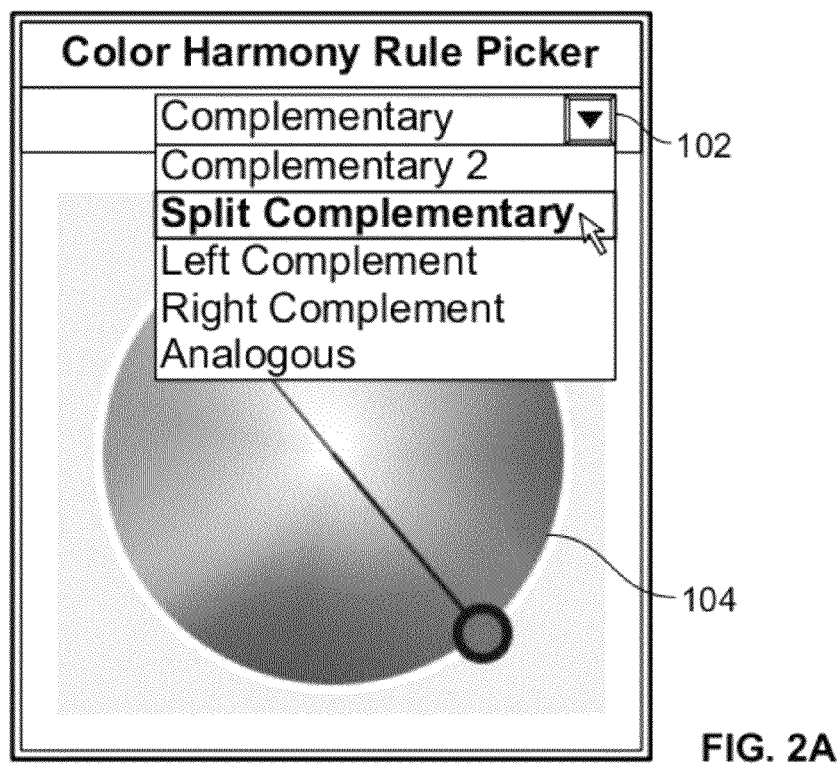
FIG. 2A is a diagram illustrating an interface in which a user has selected a pull down menu to select a color harmony rule.

FIG. 2A is a diagram illustrating an interface in which a user has selected a pull down menu to select a color harmony rule. Pull down menu 102 displays the harmony rule choices in a text list. The harmony rule choices are complementary (currently active and being displayed), complementary 2, split complementary, left complement, right complement, and analogous, in this example. The user may select one of the choices in the pull down menu to cause color wheel 104 to display the derived colors corresponding to the selected rule. The derived colors for the inactive color rules (complementary 2, split complementary, left complement, right complement, and analogous) are not displayed.

Figure 2B:
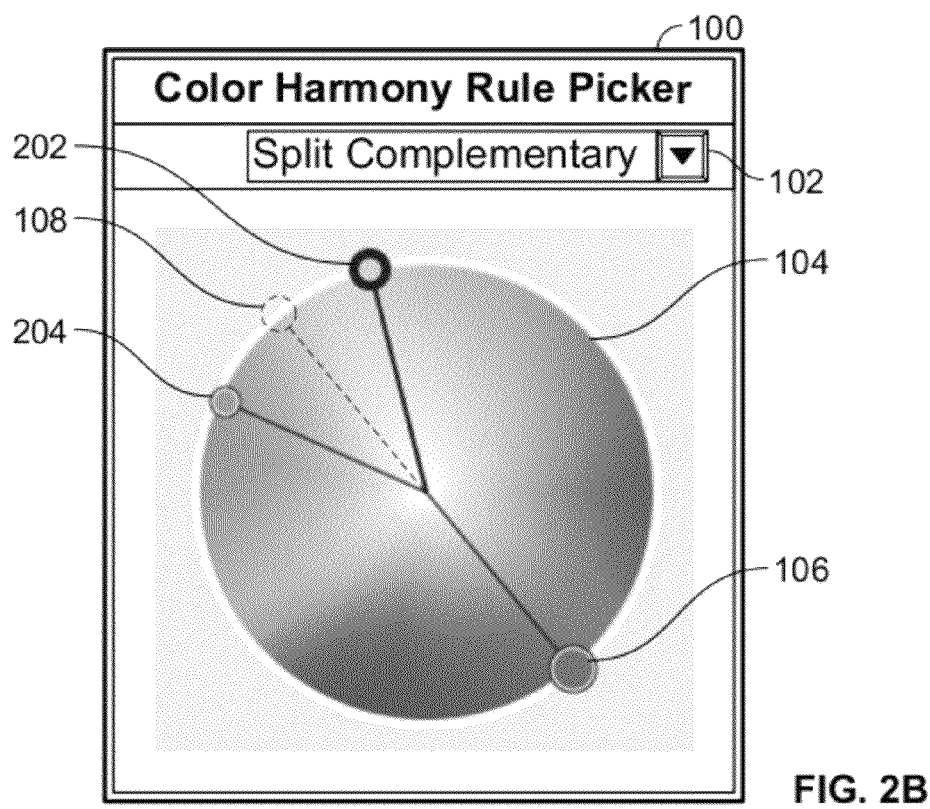
FIG. 2B is a diagram illustrating an interface for selecting a color harmony rule in which a user has selected a color harmony rule from a pull down menu.

FIG. 2B is a diagram illustrating an interface for selecting a color harmony rule in which a user has selected a color harmony rule from a pull down menu. In this example, the user has selected the color harmony rule split complementary. Circles 106, 202, and 204 show the derived colors and are placed on color wheel 104 at locations that correspond to the split complementary color harmony rule, i.e., with the base color on one side and two colors on each side of what would be the complement (circle 108). The input base color in this case corresponds to circle 106. The input base color may be specified by the user. The two (split) complementary colors correspond to circles 202 and 204.

Thus, in order to view the derived colors corresponding to the different color harmony rules, pull down menu 102 is used to successively select different color harmony rules and view the derived colors in color wheel 104 one by one.

Figure 3:
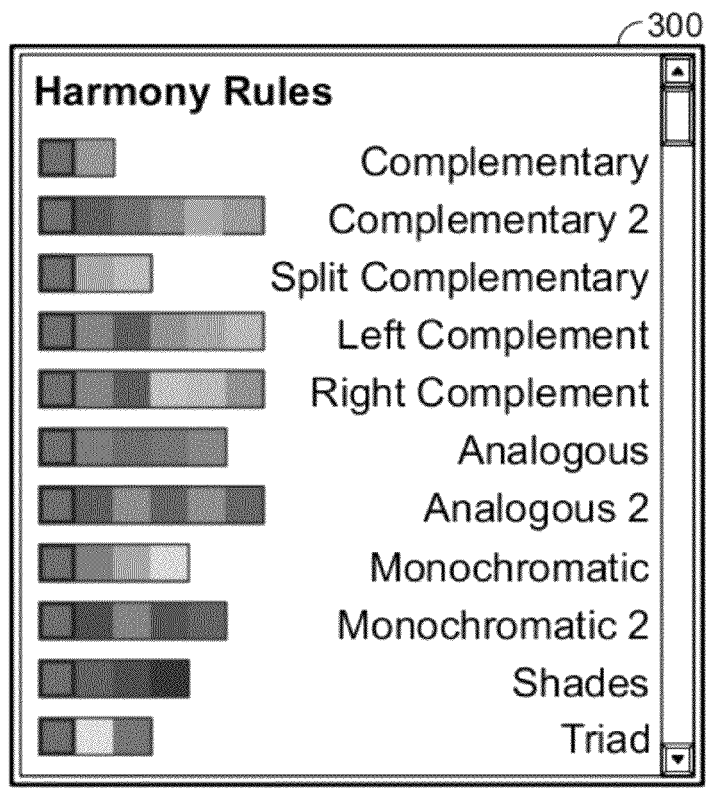
FIG. 3 is a diagram illustrating an embodiment of an interface for selecting a color harmony rule.

FIG. 3 is a diagram illustrating an embodiment of an interface for selecting a color harmony rule. In the example shown, a user is able to use such an interface to select a color harmony rule to generate a set of derived colors (e.g., for coloring an artwork). An artwork, as used herein, includes a webpage or website, an image, a logo, an illustration, a product, a 3D model, a document, an interface, etc. Interface 300 is a graphical user interface (GUI) that could be presented to a user in a design or graphics application. For example, Adobe® Illustrator®, Adobe® Photoshop®, ColorSchemer, ColorImpact, and Microsoft Acrylic, or any product that may be used to manipulate color and/or apply colors to artwork, could be configured to use interface 300.

In this example, interface 300 may be a pull down menu, replacing pull down menu 102, for example. In various embodiments, interface 300 may be a dialog box, embedded list, window or other interface. Interface 300 displays the harmony rule choices in a text list along with a preview of the derived colors for each harmony rule choice. As shown, the preview is a display of the derived colors in a set of adjacent boxes (or swatches) that are adjacent to the corresponding text for the harmony rule. In this example, the input base color for all the harmony colors is the same and is red. In this example, the first box in each row shows the base color (red). For example, in the first row, a preview of the derived colors for the color harmony rule complementary is shown. The first color in the first row is red and the second color is its complement (green). Without actually displaying the second color, most users would not be able to imagine what the second color would like, even if they know that the second color is 180 degrees apart from the first color in a color wheel.

Figure 4:
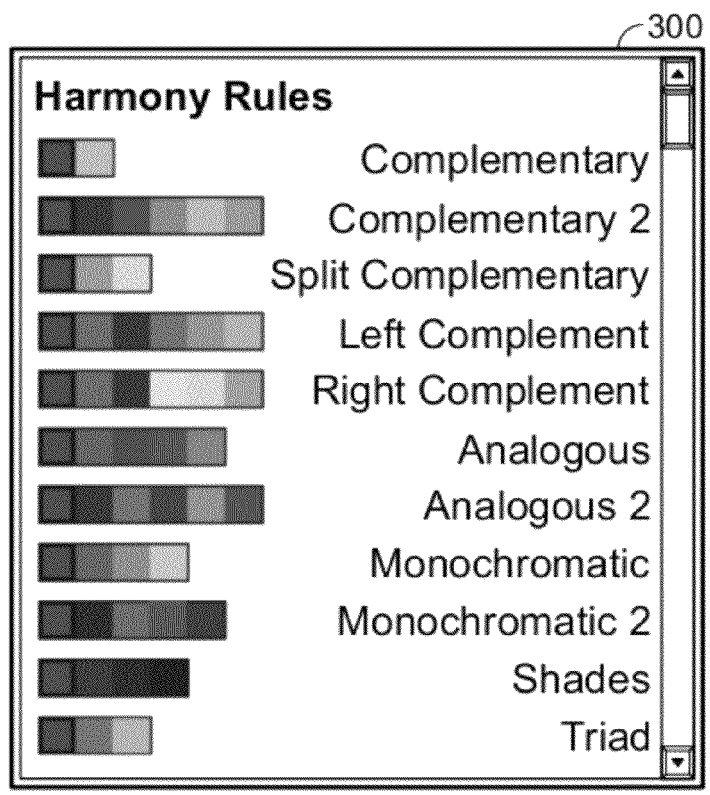
FIG. 4 is a diagram illustrating an embodiment of an interface for selecting a color harmony rule in which a different base color is selected.

FIG. 4 is a diagram illustrating an embodiment of an interface for selecting a color harmony rule in which a different base color is selected. In this example, the user has selected the base color blue using an appropriate interface (an example of which is provided below in FIG. 6). As a result, interface 300 is updated to display the derived colors for each of the color harmony rules when the input base color is blue. Interface 300 dynamically updates when a different base color is selected. In some embodiments, interface 300 dynamically updates when different color harmony rule input values are selected, as more fully described below. By contrast, the list shown in pull down menu 102 (FIG. 2A) is static and is not updated when a new base color is selected, nor is it updated when different color harmony rule input values are selected.

As shown in FIGS. 3 and 4, a user can easily perform or view a side by side comparison of the various derived color sets that result from different color harmony rules. There is no need to perform the task of having to select each color harmony rule one by one from a pull down menu. For each rule, what the actual derived colors look like for each rule is displayed and the user also can view the derived colors corresponding to different color harmony rules side by side. In some embodiments, rather than displaying a list of rule names for selection, a list of colors sets is displayed for selection. Users who do not understand harmony rule names can easily pick a color harmony rule this way. Users do not have to think about geometry to pick a color harmony rule. With custom rules, there is no need to create a descriptive name or icon for it.

This is in contrast to some other techniques where (for example) in order to view the actual derived colors, the user must actually select a rule, then the application derives the colors using the rule and displays them. A user typically would like to compare and select among multiple color harmonies. In order to do so using some techniques, the user must select each rule, view the derived colors, then select the next rule, view the derived colors corresponding to the next rule, etc. until all the color harmonies of interest have been viewed, which is a tedious and time consuming process.

Interface 300 displays a preview of the derived colors for each color harmony rule. Interface 300 displays the name (the input) of each harmony rule along with the derived colors (the output) of each harmony rule applied to the base color. To do this, in some embodiments, the derived colors are precomputed or predetermined for each color harmony rule selection so that they can be displayed simultaneously as shown in interface 300, as more fully described below.

Figure 5:
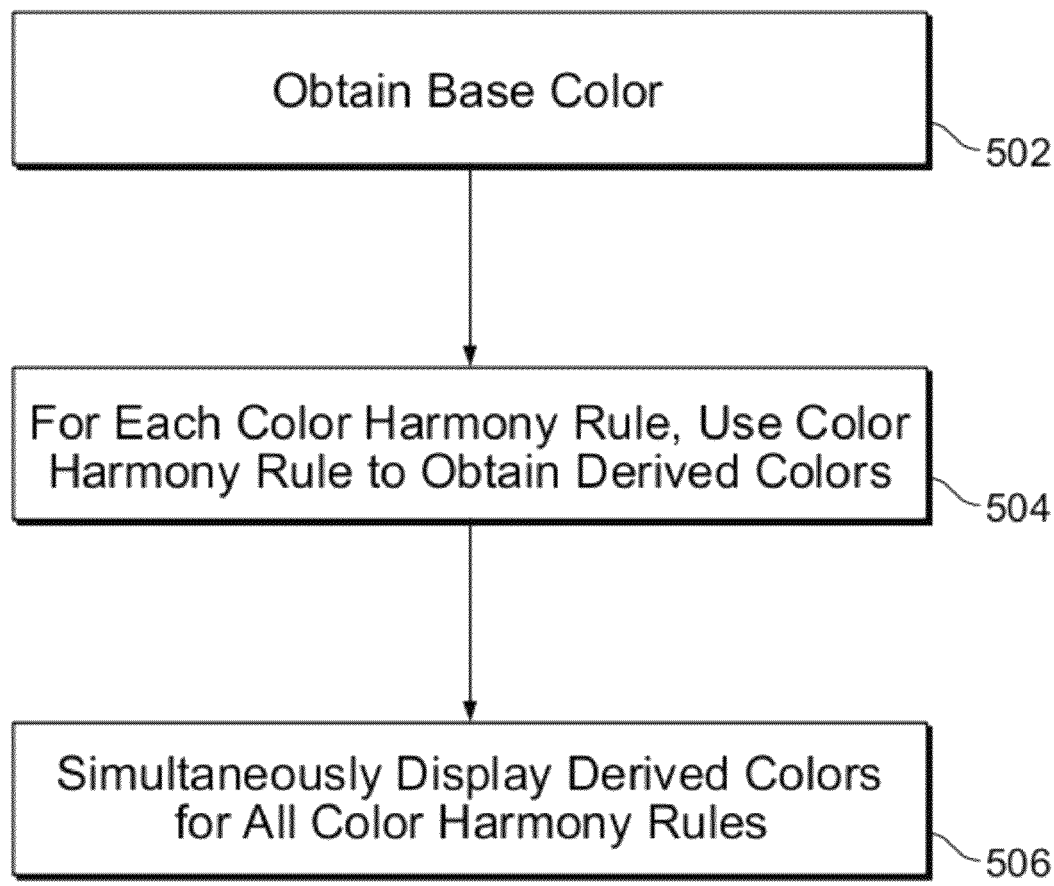
FIG. 5 is a flowchart illustrating an embodiment of a process for displaying color harmony rule choices.

FIG. 5 is a flowchart illustrating an embodiment of a process for displaying color harmony rule choices. For example, this process may be used to display interface 300. At 502, a base color is obtained. In some embodiments, the base color is input or otherwise specified by the user and various interfaces may be provided for doing so. More than one base color may be obtained for color harmony rules that take more than one base color as input.

At 504, for each color harmony rule, the color harmony rule is used to obtain derived colors. For example, if the set of color harmony rules is complementary, split complementary, and myHarmony, then each of the harmony rules is applied to the base color obtained at 502 to obtain a set of derived colors for each color harmony rule. (As used herein, myHarmony is a custom or user-designed color harmony rule.) For each color harmony rule, a set of derived colors is obtained. Each set may have one or more colors, depending on the color harmony rule. For example, split complementary has 3 colors and complementary has 2 colors.

At 506, the sets of derived colors are simultaneously displayed for all color harmony rules. For example, interface 300 shows each derived set in a separate row adjacent to the name of its corresponding color harmony rule. In other embodiments, the derived colors may be displayed in other ways, such as in circles or other shapes. In some embodiments, the derived colors are shown in a common artwork, such as a standard image that may be user configurable, or an active image that the user is currently working on. For example, for each color harmony, a smaller version of the image may be shown colored with the derived colors for each color harmony rule. In some embodiments, these small images are shown side by side to easily compare them. The images may be shown in separate windows so that they can be arranged on the desktop by the user. For example, the user may close the windows that he does not like and only keep open the windows he likes so he can narrow down the candidates to a favorite window, and select the corresponding color harmony rule. This way, the user can view what the derived colors would look like when applied to an artwork for a color harmony rule before selecting the color harmony rule. The user can view the artwork for all color harmony rules simultaneously and is able to do a side by side comparison. In some embodiments, the derived colors are displayed in an interface for selecting a color harmony rule, as in interface 300.

In some embodiments where the harmony rule produces a range of derived colors instead of explicit derived colors, the derived colors may be displayed as gradient filled shapes that depict a color range. In some embodiments where the harmony rule displays a large quantity of derived colors, the derived color display may be simplified to only display the most important colors.

Simultaneous display of items (such as sets of derived colors) means that all items are displayed. The items may be displayed simultaneously in different windows and the windows may overlap. However, the windows are still all simultaneously displaying the items even if they are overlapping and not visible to the user at a given instant. In some embodiments, because of a limited amount of display area, not all sets of derived colors are able to be displayed at the same time but this is still considered simultaneous display. For example, because of limited display space only four of six sets of derived colors can be displayed at a time and a user uses a scroll up/down bar to see the other sets of derived colors not currently displayed.

Figure 6:
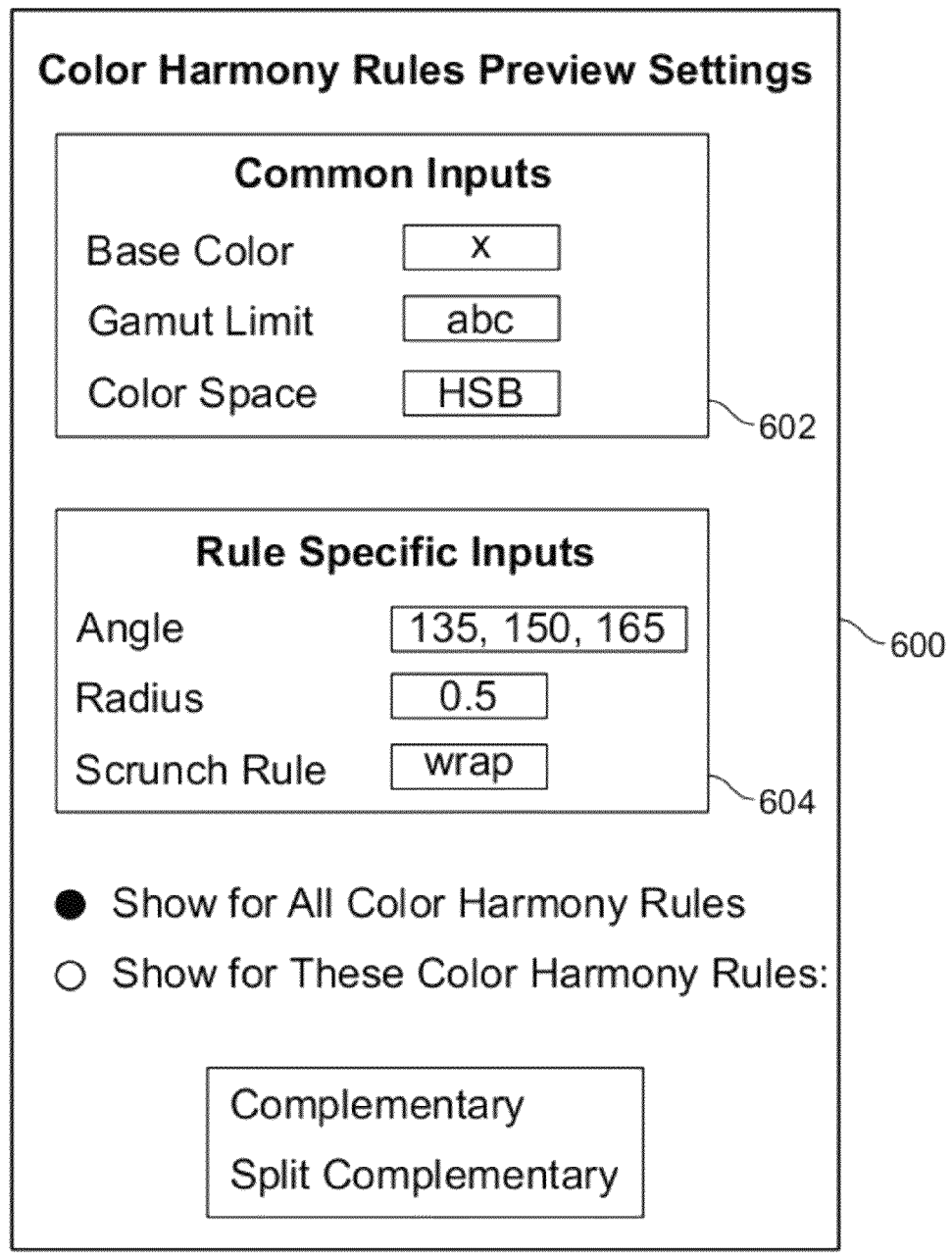
FIG. 6 is a diagram illustrating an embodiment of an interface for inputting color harmony rules preview settings.

FIG. 6 is a diagram illustrating an embodiment of an interface for inputting color harmony rules preview settings. In some embodiments, an interface may be provided for a user to view or modify the inputs to various color harmony rules. The interface may be used to specify a range of inputs so that the preview shows the derived colors for a given color harmony for multiple input values or combinations of input values. For example, a user may be interested in comparing what split complementary looks like for a variety of input angles.

In this example, interface 600 is shown to include a place to enter common inputs 602 and a place to enter rule specific inputs 604. Common inputs 602 are inputs that are common to all color harmony rules. For instance, in this example all color harmony rules take or may take as input at least one base color, a gamut limit (e.g., RGB, CMYK, LAB, HSB), and a color space. A user may use common inputs interface 602 to input one or more base colors, a gamut limit, and a color space. As shown in interface 602, a user has entered one base color value, one gamut limit value, and one color space value. In some embodiments, a user may enter one or more values in each of the input boxes in common inputs interface 602.

Rule specific inputs are inputs that are not common to all color harmony rules. For example, many but not all color harmony rules take an angle as input. For example, the color harmony rule split complementary does take an angle as input—the angle of the split colors around the complement of the base color; whereas, the color harmony rule complementary does not take an angle as input—the derived colors include only two colors—the base color and the color opposite (or 180 degrees from) the base color. In some embodiments, interface 604 allows a different angle value to be specified for different color harmony rules.

Similarly, the radius and scrunch rule inputs are not common to all color harmony rules. A user may enter one or more values in each of the input boxes in rules specific inputs interface 604. As shown in interface 604, a user has entered three angle values, one radius value, and "wrap" for the scrunch rule. In this example the scrunch rule determines how the saturation and brightness values of derived colors are modified when the harmony rule formula produces values that are out of range. If the derived brightness value was 120, the maximum was 100 and the minimum was 0, then the "wrap" rule would connect the minimum and maximum in a circular fashion, so that 120 would become 20 or a value of −30 would become 70.

Other embodiments might have different common inputs and rule specific inputs from those shown here. In other embodiments, interfaces 602 and/or 604 may use a variety of objects for accepting input. For example, instead of input text boxes, pull down menus, sliders, knobs, checkboxes, etc., may be used instead or in addition to input text boxes. In addition, a different set of common inputs and/or rule specific inputs may be made available for the user to edit depending on the embodiment. For example, "Limit to Libraries" may be another input which forces the derived colors to be limited to colors in a color library. "Number of Derived Colors" may be another input which applies to rules like the analogous color harmony rule, in which the number of derived colors can vary.

At the bottom of interface 600, two options are shown. A user may select one or the other option using the radio buttons. The first option is "Show for All Color Harmony Rules" which when selected means that colors are derived for all color harmony rules for all combinations of the common and rule specific input values and simultaneous displayed, e.g., in a preview window for the user to select a color harmony rule, such as interface 300. The second option is "Show for These Color Harmony Rules" followed by an input box for inputting one or more color harmony rules. When the second option is selected, colors are only derived for the specified color harmony rules for all combinations of the common and rule specific input values.

Although interface 600 shows that a user may specify input values, in various embodiments, one or more input values may be fixed and not user configurable, or provided by a machine, e.g., through a scripting tool, or input using other means.

In some embodiments, interface 600 defaults to one value per input and "Show for All Color Harmony Rules" selected. In some embodiments, interface 600 includes a set of higher level controls that may be more intuitive to a user, such as a knob to control contrast, a slider to control temperature (cooler or warmer). Adjusting a higher level control automatically adjusts one or more of the input values. For example, increasing a contrast value or setting may cause the angle value to increase.

In some embodiments, the default values for the color harmony rule inputs may be automatically determined. In some embodiments, the default values are determined based on the color statistics of an input photo or set of photos. For example, a user inputs a set of pictures from a wedding. The set of pictures is analyzed to obtain color statistics. From the color statistics, default color harmony rule input values may be automatically selected. For example, the most dominant color in the set of pictures may be identified as the base color.

If most of the pixels have colors that are near in angle to the base color, then analogous with multiple smaller angle values may be the default setting, while the other input values are held constant. If there are multiple dominant colors, multiple base colors may be identified. Thus, the input photo set can be used to automatically select which color harmony rules and/or input values to display. In this way, by inputting a set of wedding photos, a list of derived colors that would go well in a wedding album would be displayed for selection by the user.

Figure 7:
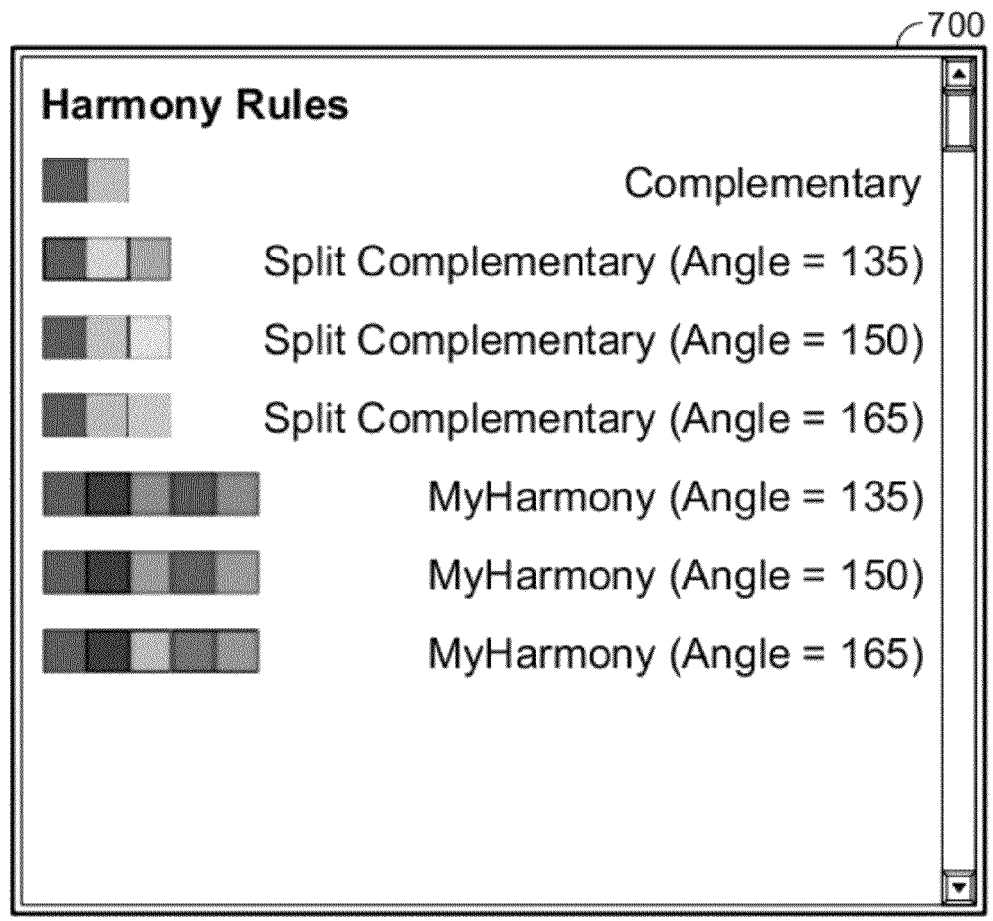
FIG. 7 is a diagram illustrating an embodiment of an interface for selecting a color harmony rule and color harmony rule input(s).
Figure 7:
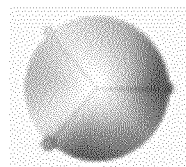
Figure 7:
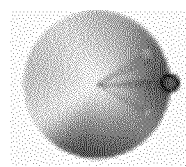
Figure 7:
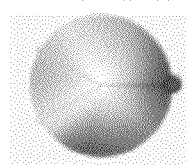
Figure 7:
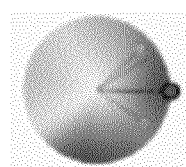
Figure 7:
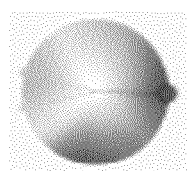
Figure 7:
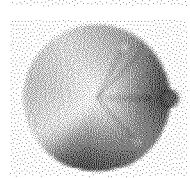

FIG. 7 is a diagram illustrating an embodiment of an interface for selecting a color harmony rule and color harmony rule input(s). Interface 700 may be a pull down menu, replacing pull down menu 102, for example. In various embodiments, interface 700 may be a dialog box or other interface. Interface 700 displays the harmony rule choices in a text list along with a preview of the derived colors for each harmony rule choice. Interface 700 displays the derived colors for each color harmony rule and for each combination of input values specified, e.g., in interface 600. For harmony rule choices split complementary and myHarmony, three choices are shown, corresponding to the three angles that were input into interface 600.

Thus, a user who is interested in comparing what split complementary looks like for a variety of input angles would be able to specify a variety or input angles using interface 600, causing interface 700 to automatically update to show the derived colors for split complementary for each of the input angles.

Figure 8:
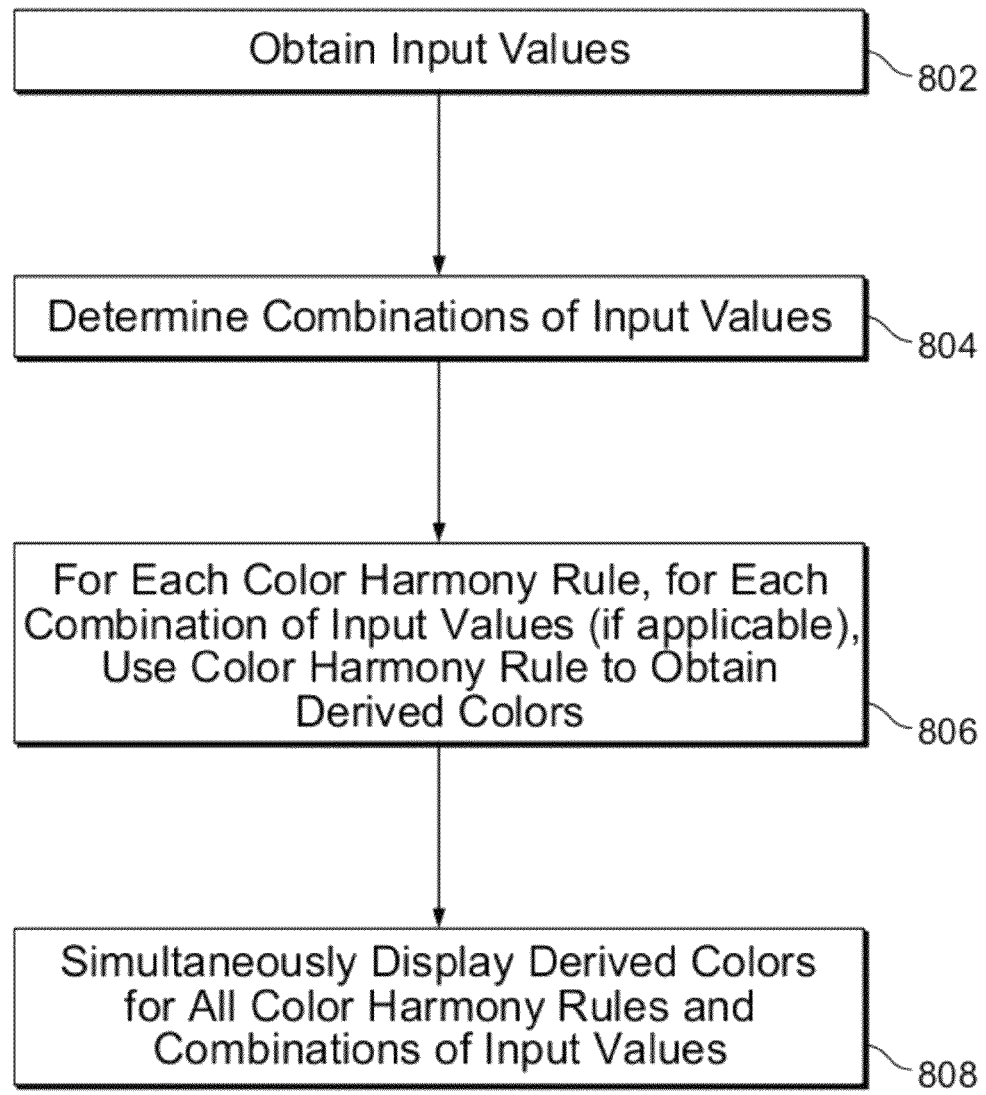
FIG. 8 is a flowchart illustrating an embodiment of a process for displaying color harmony rule choices with different color harmony rules input(s).

FIG. 8 is a flowchart illustrating an embodiment of a process for displaying color harmony rule choices with different color harmony rules input(s). For example, this process may be used to display interface 700. At 802, input values are obtained. In some embodiments, the input values are specified by a user using an interface such as interface 700. In some embodiments, one or more input values are preset, e.g., to default values. As shown in interface 700, more than one input value may be specified for a given input.

At 804, combinations of input values are obtained. For example, in interface 700, the combinations include: angle=135, 150, 165 since all the other inputs only have one value specified. For example, if two values, 0.5 and 1, were specified for the radius, the combinations would be: Angle=135, Radius=0.5; Angle=135, Radius=1; Angle=150, Radius=0.5; Angle=150, Radius=1; Angle=165, Radius=0.5; and Angle=165, Radius=1.

At 806, for each color harmony rule, for each combination of input values (if applicable), the color harmony rule is used to obtain derived colors. If a rule specific input is not used with a particular rule (i.e., the input value is not applicable), then the color harmony does not need to be derived for each of the values of that rule specific input. For example, since angle is not an input to the color harmony rule complementary, then the derived colors for the complementary rules are only derived once, ignoring the three angle values. However, for the color harmony rules split complementary and myHarmony (assuming that myHarmony uses angle as input), colors are derived for each of the three angles 0, 5, and 10.

At 808, the derived colors are simultaneously displayed for all color harmony rules and combinations of input values. An example of this is interface 700, as previously described. If in interface 600, "Show for These Color Harmony Rules" is selected, then 804-808 are only performed for the specified color harmony rules.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, including:
   obtaining at least one base color and two or more color harmony rules;
   for each color harmony rule, computing, using a processor, a derived set of colors based at least in part on the at least one base color and the color harmony rule, resulting in two or more derived sets of colors;
   simultaneously displaying the derived sets of colors for the two or more color harmony rules in a pull down menu included in a user interface, including by displaying each of the derived set of colors applied to an artwork; and
   receiving, via the user interface, a selection of one of the two or more color harmony rules based on the display.

2. A method as recited in claim 1, wherein the two or more color harmony rules include all color harmony rules available.

3. A method as recited in claim 1, further including obtaining two or more values of a rule specific input.

4. A method as recited in claim 1, wherein computing is performed for each combination of color harmony rule and value of a rule specific input, if applicable.

5. A method as recited in claim 1, further including analyzing input artwork to determine the at least one base color.

6. A method as recited in claim 1, wherein displaying includes displaying for selection.

7. A method as recited in claim 1, wherein displaying includes displaying the derived sets of colors in boxes.

8. A method as recited in claim 1, wherein displaying includes displaying each of the derived sets of colors adjacent to its corresponding color harmony rule name.

9. A method as recited in claim 1, wherein each of the two or more color harmony rules includes a discrete and finite set of two or more elements having fixed relationships with each other and each of the two or more derived set of colors includes a discrete and finite set of two or more colors.

10. A method as recited in claim 9, further including analyzing input artwork to determine a value for a rule specific input.

11. A method as recited in claim 9, further including analyzing input artwork to determine a color harmony rule.

12. A method as recited in claim 9, wherein at least one of the two or more color harmony rules is a user-defined harmony rule.

13. A computer program product, the computer program product being embodied in a computer readable storage medium and comprising computer instructions for:
   obtaining at least one base color and two or more color harmony rules;
   for each color harmony rule, computing a derived set of colors based at least in part on the at least one base color and the color harmony rule, resulting in two or more derived sets of colors;
   simultaneously displaying the derived sets of colors for the two or more color harmony rules in a pull down menu included in a user interface, including by displaying each of the derived set of colors applied to an artwork; and
   receiving, via the user interface, a selection of one of the two or more color harmony rules based on the display.

14. A computer program product as recited in claim 13, wherein the two or more color harmony rules include all color harmony rules available.

15. A computer program product as recited in claim 13, further including obtaining two or more values of a rule specific input.

16. A computer program product as recited in claim 13, wherein computing is performed for each combination of color harmony rule and value of a rule specific input, if applicable.

17. A computer program product as recited in claim 13, wherein each of the two or more color harmony rules includes a discrete and finite set of two or more elements having fixed relationships with each other and each of the two or more derived set of colors includes a discrete and finite set of two or more colors.

18. A computer program product as recited in claim 17, wherein at least one of the two or more color harmony rules is a user-defined harmony rule.

19. A system, including:
a processor; and
a memory coupled with the processor, wherein the memory is configured to provide the processor with instructions which when executed cause the processor to:
obtain at least one base color and two or more color harmony rules;
for each color harmony rule, compute a derived set of colors based at least in part on the at least one base color and the color harmony rule, resulting in two or more derived sets of colors;
simultaneously display the derived sets of colors for the two or more color harmony rules in a pull down menu included in a user interface, including by displaying each of the derived set of colors applied to an artwork; and
receiving, via the user interface, a selection of one of the two or more color harmony rules based on the display.

20. A system as recited in claim 19, wherein the two or more color harmony rules include all color harmony rules available.

21. A system as recited in claim 19, wherein the memory is further configured to obtain two or more values of a rule specific input.

22. A system as recited in claim 19, wherein the memory is configured to compute the derived set of colors for each combination of color harmony rule and value of a rule specific input, if applicable.

23. A system as recited in claim 19, wherein each of the two or more color harmony rules includes a discrete and finite set of two or more elements having fixed relationships with each other and each of the two or more derived set of colors includes a discrete and finite set of two or more colors.

24. A system as recited in claim 23, wherein at least one of the two or more color harmony rules is a user-defined harmony rule.

* * * * *